(12) United States Patent
Joki et al.

(10) Patent No.: US 7,108,427 B2
(45) Date of Patent: Sep. 19, 2006

(54) WHEEL END WITH ROTATION SENSOR

(75) Inventors: Mark A. Joki, Dover, OH (US);
Timothy J. Krabill, Louisville, OH (US)

(73) Assignee: The Timken Company, Canton, OH (US)

( * ) Notice: Subject to any disclaimer, the term of this patent is extended or adjusted under 35 U.S.C. 154(b) by 120 days.

(21) Appl. No.: 10/513,715

(22) PCT Filed: May 6, 2003

(86) PCT No.: PCT/US03/14477

§ 371 (c)(1),
(2), (4) Date: Nov. 8, 2004

(87) PCT Pub. No.: WO03/095240

PCT Pub. Date: Nov. 20, 2003

(65) Prior Publication Data

US 2005/0175267 A1    Aug. 11, 2005

Related U.S. Application Data

(60) Provisional application No. 60/378,767, filed on May 8, 2002.

(51) Int. Cl.
*F16C 19/00* (2006.01)
(52) U.S. Cl. .................. 384/448; 384/484
(58) Field of Classification Search ............. 384/448, 384/477, 484–486; 324/174, 207.25
See application file for complete search history.

(56) References Cited

U.S. PATENT DOCUMENTS

| | | |
|---|---|---|
| 5,143,458 A | 9/1992 | Alff et al. |
| 5,195,830 A | 3/1993 | Caillault et al. |
| 5,575,568 A | 11/1996 | Rigaux et al. |
| 5,852,361 A | 12/1998 | Ouchi et al. |
| 5,997,182 A | 12/1999 | Brown |
| 6,232,772 B1 | 5/2001 | Liatard et al. |
| 6,267,509 B1 | 7/2001 | Morimura |

*Primary Examiner*—Thomas R. Hannon
(74) *Attorney, Agent, or Firm*—Polster, Lieder, Woodruff & Lucchesi, L.C.

(57) ABSTRACT

A wheel end (A, B, C) for mounting a road wheel (W) of an automotive vehicle includes a knuckle (2) having a bearing cavity (20, 24, 26), a hub having a spindle (40) that projects into the bearing cavity of the knuckle and a flange (42) at one end of the spindle, with the road wheel being attached to it, and a bearing (6) located within the bearing cavity and around the spindle of the hub to enable the hub to rotate on the spindle. The bearing includes tapered rollers (72) organized in outboard and inboard rows as well as raceways (60, 76, 82) along which they roll. The rollers of the inboard row roll along tapered raceways on a cup pressed into the bearing cavity and a cone (66) pressed over the spindle. The bearing is closed at that end by an inboard seal (12, 174, 184, 208) which includes a case (130) pressed into a bore (24) that forms part of the bearing cavity, a shield (132) pressed over a thrust rib at the end of the cone, and a seal element (134, 178) bonded to the case and establishing a fluid barrier with the shield. The shield has a wall (142, 188) which serves as a tone ring, and this ring is monitored by a sensor (14, 186, 212) which is fitted to the knuckle at the inboard end of the bearing cavity. A CV joint (8) engages the spindle, and it carries a slinger (16) which flings contaminants and debris away from the cavity and further has a seal element (154) which establishes a fluid barrier around the end of the cavity.

22 Claims, 3 Drawing Sheets

WHEEL END WITH ROTATION SENSOR

CROSS REFERENCE TO RELATED APPLICATIONS

This application derives priority from U.S. provisional application 60/378,767, filed May 8, 2002, and entitled "Drive Wheel Unit With Rotation Sensing".

TECHNICAL FIELD

This invention relates in general to wheel ends for automotive vehicles, and more particularly to a wheel end having a speed sensor.

The manufacturers of automobiles, light trucks, and vans rely more and more on preassembled wheel ends to facilitate the assembly of such vehicles. The typical wheel end has a hub to which a road wheel is secured, a housing into which a portion of the hub projects, and an antifriction bearing between the housing and hub to enable the hub to rotate in the housing. The bearing has its rolling elements organized in two rows, with the one row being capable of taking thrust loads in one direction and the other row capable of taking thrust loads in the other direction. Of course, both rows also transfer radial loads between the hub and housing. The housing is typically bolted to a knuckle of a vehicle suspension system, whether it is a front steering knuckle or a rear knuckle. The bearing should operate in a condition of preload, that is without any clearances between the rolling elements and the raceways along which they roll, this to insure that the axis of rotation remains stable with respect to the housing.

Since setting the bearings to the proper preload demands a good measure of precision and skill, this procedure is best left to the manufacturers of the wheel ends. Indeed, the wheel ends are often supplied as preassembled packages with their bearings properly set. Where a vehicle has an antilock braking system or a traction control system or both, at least some of its wheel ends require sensing devices for monitoring the angular velocities of the hubs and of course the road wheels attached to such hubs.

The typical sensing device has a speed sensor mounted on the housing and a tone ring of some type on the hub at a location where its rotation can be monitored by the sensor. The sensor may operate on any of several known principles. The locations of the sensors and tone rings in wheel ends of current manufacture vary. Some have the tone rings and sensors exposed where they are subject to damage by rocks and other road debris. In another type the sensor projects through the housing to monitor the tone ring which is between the two rows of rolling elements. This requires a wider spread between the two rows, thus increasing the width of wheel end. It also requires routing the cable for the sensor past the brake rotor where the cable may be exposed to elevated temperatures capable of damaging it.

In one type of wheel end the bearing has a unitary outer race with two raceways and two inner races, each with its own raceway. The seals are fitted to the races, and one of those seals carries the tone ring. See U.S. Pat. No. 5,947,611. This requires cylindrical bores at the ends of the unitary outer race for accommodating the seals, and this in turn increases the complexity of manufacturing the outer race. Forging, turning, grinding and superfinishing are all rendered more difficult. Indeed, the grinding wheel and superfinishing stone cannot oscillate a good distance parallel to the race without colliding with the surfaces of the cylindrical bores. Apart from that, the seals are first installed in the bearing, and then the bearing is installed in the knuckle. Thus, the position of the bearing controls the position of the tone ring, and the tone ring may not locate the optimum distance from a sensor that is later installed.

SUMMARY OF THE INVENTION

The present invention resides in a wheel end that includes a knuckle having a bearing cavity, a hub that has a spindle which projects into the bearing cavity, and a bearing located within the cavity and around the spindle. The bearing at one end has an outer race and an inner race and rolling elements between the races. That end of the bearing is protected by a seal located in the cavity and around the inner race. The seal carries a tone ring which is monitored by a sensor carried by the knuckle.

BRIEF DESCRIPTION OF DRAWINGS

Corresponding reference characters indicate corresponding parts throughout the several views of the drawings.

BEST MODE FOR CARRYING OUT THE INVENTION

Figure 1:
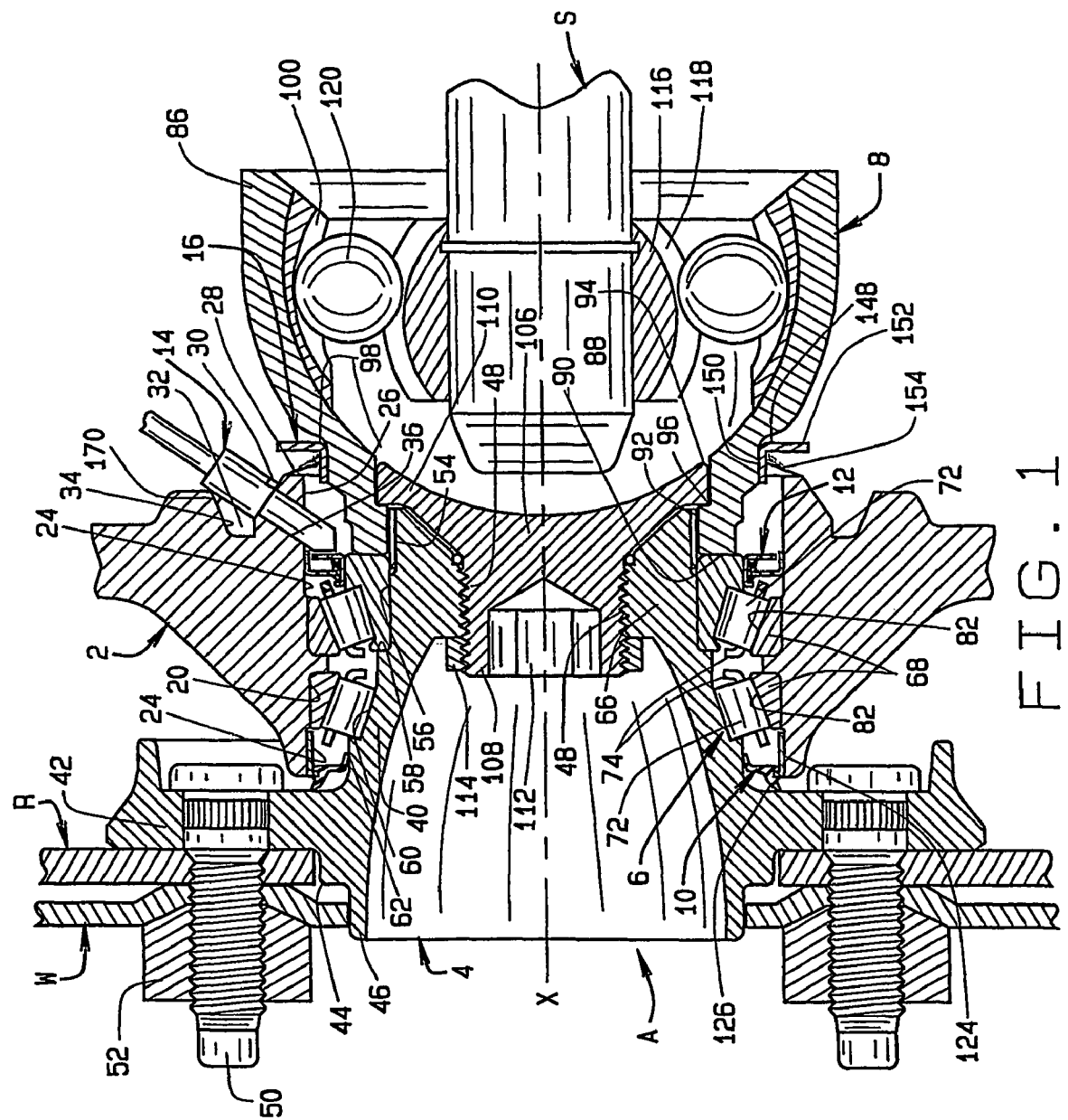
FIG. 1 is a longitudinal sectional view of a wheel end constructed in accordance with an embodying the present invention.

Referring now to the drawings (FIG. 1), a wheel end A serves to couple a road wheel W and brake rotor R for an automotive vehicle to the suspension system for the vehicle and may further couple the road wheel W to an axle shaft S forming part of the drive train for the vehicle. The wheel end A includes (FIG. 1) a knuckle 2 that is designed to move generally vertically on the vehicle against the bias of a spring or torsion bar. Where the road wheel W that is coupled to the wheel end A is at the front of the vehicle, the knuckle 2 can also pivot about an upright axis to steer the vehicle. On the other hand, where the road wheel W is at the rear of the vehicle, the knuckle 2 simply moves upwardly and downwardly. In addition, the wheel end A includes a hub 4 which rotates in the knuckle 2 and a bearing 6 located between the hub 4 and the knuckle 2. Indeed, the bearing 6 enables the hub 4, the brake rotor R, and the road wheel W to rotate about an axis X that is fixed in position with respect to the knuckle 2. The wheel end A may also include a CV (constant velocity) joint 8 which couples the hub 4 with the axle shaft S. To protect the bearing 6 from contaminants, the wheel end A is provided with an outboard seal 10 and an inboard seal 12. The latter further serves as a tone ring for a speed sensor 14 which is carried by the knuckle 2, and produces a signal that reflects the angular velocity of the hub 4. The sensor 14 is in turn protected by a slinger 16 which establishes a fluid barrier between the knuckle 2 and CV joint 8.

The knuckle 2 serves as a housing for the bearing 6 and to this end contains two bores 20—an outboard bore and an inboard bore—which receive the bearing 6. Each bore 20 leads up to a shoulder at its inner end and opens into a counterbore 24, which actually a larger bore, at its outer end. The outboard counterbore 24 opens out of the front face of the member 2, whereas the inboard counterbore 24 opens into another counterbore 26 which in turn leads out to an end face 28, out of which it opens. The bores 20 and the counterbores 24 and 26 form a bearing cavity in the knuckle 6.

The end face 28 leads away from the end of the large counterbore 26 to seating pad 30 which lies oblique to the axis X and extends into a recess 32 that opens out of the rear of the knuckle 2. It forms an orienting surface 34 which is likewise inclined with respect to the axis X, but opposite to the inclination of the pad 30. Behind the inboard seal 12 the knuckle 2 contains an oblique bore 36 which at its outer end opens out of the pad 30 and at its other end opens into the large counterbore 26 close to the end of the smaller counterbore 24. The axis of the oblique bore 36, while being oblique to the axis X of the bearing 6, is perpendicular to the pad 30. The bore 36 receives the sensor 14.

The hub 4 includes a spindle 40 which extends into the knuckle 2 and a flange 42 which is formed integral with spindle 40 as a single casting or forging and lies beyond the front face of the knuckle 2. In addition, the hub 4 has a rotor pilot 44 and wheel pilot 46 which are also formed integral with the flange 42 and project forwardly from it in the direction opposite that in which the spindle 40 projects. The hub 4 is hollow and at the inboard end of the spindle 40 is provided with a threaded bore 48. Finally, the hub 4 contains threaded studs 50 which project through the flange 24 and forwardly from it. Indeed, the studs 50 pass through the brake rotor R and road wheel W, beyond which they are engaged by lug nuts 52 for securing the wheel W and rotor R to the hub 4.

The spindle 40 at its inboard end has an external spline 54 that leads up to a cylindrical bearing seat 56 which is of greater diameter and lies within the inboard bore 20 and counterbore 24 of the knuckle 2. The seat 56 terminates at a shoulder 58 beyond which the spindle 40 has a tapered raceway 60 that lies within the outboard bore 20 of the knuckle 2. The small end of the raceway 36 is closest to the bearing seat 56, its diameter being greater than the diameter of the seat 56, while the large end is located at a thrust rib 62 which leads out to the flange 42. The raceway 60 and thrust rib 62, while being integral with the spindle 40 of the hub 4, actually constitute part of the bearing 6.

The bearing 6 includes an inner race in the form of the raceway 60 and thrust rib 62 on the spindle 40 and a cone 66 located around the bearing seat 56. It also includes an outer race in the form of two cups 68, one an outboard cup 68 located around the raceway 60 and the other an inboard cup 68 located around the cone 66. Also, the bearing 6 has rolling elements in the form of tapered rollers 72 arranged in two rows, there being a separate row within each cup 68. Finally, the bearing 6 within each row of tapered rollers 72 includes a cage 74 for maintaining the proper spacing between the rollers 72.

Figure 2:
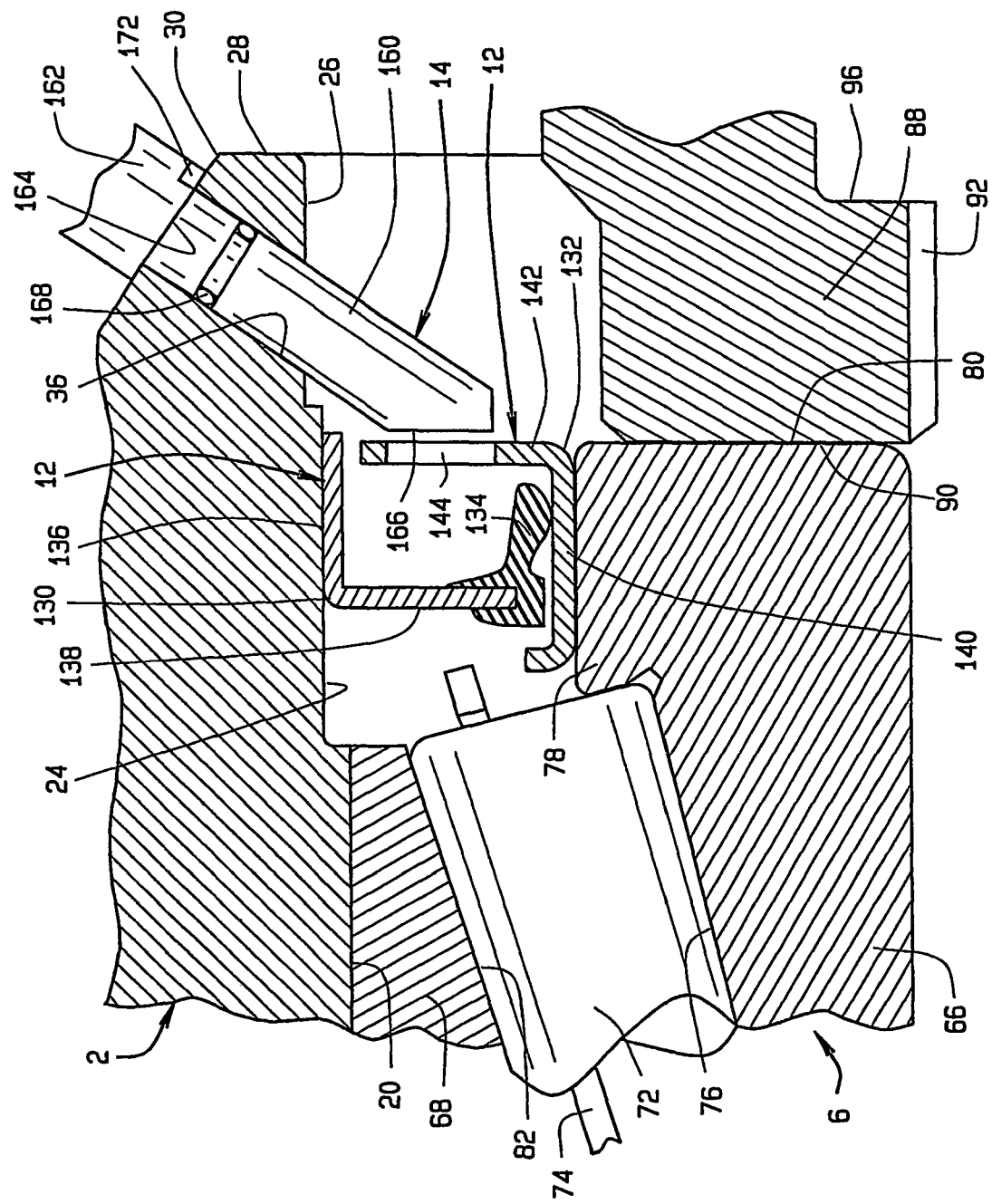
FIG. 2 is an enlarged sectional view of the inboard seal for the wheel end.

The cone 66, which is an initially separate bearing component, fits around the bearing seat 56 with an interference fit. It has (FIG. 2) a tapered raceway 76 which is presented outwardly away from the axis X and a thrust rib 78 at the large end of the raceway 76. The thrust rib 78 leads out to a back face 80 which is squared off with respect to the axis X. The opposite end of the cone 66, that is its small end, abuts the shoulder 58 on the spindle 40.

Each cup 68 has a tapered raceway 82 that is presented inwardly toward the axis X. The two cups 68 fit into the bores 20 of the knuckle 2 with interference fits and with their raceways 82 tapering downwardly toward each other and their ends against the shoulders at the ends of the bores 20. The raceway 82 on the outboard cup 68 faces and is inclined in the same direction as the outboard raceway 60 on the spindle 40, whereas the raceway 82 on the inboard cup 68 faces and is inclined in the same direction as the raceway 76 on the cone 66.

The tapered rollers 72 of the outboard row lies between the raceway 60 on the spindle 40 and the raceway 82 of the outboard cup 68. Along their side faces they contact those raceways 60 and 82, while their large end faces bear against the thrust rib 62 on the spindle 22. The tapered rollers 72 of the outboard row lie between cone 66 and the inboard cup 68 where their tapered side faces contact the raceways 26 and 82 of the cone 66 and inboard cup 68, respectively, while their large end faces bear against the thrust rib 78 on the cone 66. The rollers 72 of each row are on apex, meaning that the conical envelopes of their side faces, as well as the conical envelopes for the raceways 60, 76, 82 along which they roll, have their apices at a common point along the axis X. Also, the inclination of the outboard raceways 60 and 82 is opposite that of the inboard raceways 76 and 82, so that the small ends of the rollers 72 in the outboard row are presented toward the small ends of the rollers 72 in the inboard row. This orientation, called an "indirect mounting", enables the bearing 6 to accommodate thrust loads in both axial directions. Moreover, the bearing 6 is in a condition of preload, so that no radial or axial clearances exist within it.

The CV joint 8 couples the axle shaft S to the hub 4, thus enabling the road wheel W and brake rotor R to rotate with the shaft S. To this end, the CV joint 8 includes an outer joint member 86 having a generally cylindrical end 88 which leads out to an end face 90 that is squared off with respect to the axis X. Internally, the cylindrical end 88 has a spline 92 which extends between the end face 90 and a counterbore 94, opening into the counterbore 94 at a shoulder 96. The cylindrical end 88 fits into the large counterbore 26 that opens out of the end face 28 of the knuckle 2 and further fits over the inboard end of the spindle 40 where its internal spline 92 engages the external spline 54 on the spindle 40. The end face 90 on the cylindrical end 88 bears against the back face 80 of cone 66, while the shoulder 96 lies slightly beyond the inboard end of the spindle 40. Beyond the cylindrical end 88 the outer joint member 86 has a cylindrical slinger seat 98 of greater diameter. The seat 98 serves as a mount for the slinger 16 which is pressed over it. Internally, the main body of the outer joint member 86 contains several arcuate grooves 100.

The outer joint member 86 of the CV joint 8 is secured to the hub 4 with a retainer 106 having a threaded plug 108 and a flange 110 directed outwardly from the plug 108. The thread on the plug 108 engages the threads of the threaded bore 48 in the spindle 40 while the flange 110 lies within the outer joint member 86 behind the shoulder 96. The plug 108 contains a socket 112 that opens into the hollow interior of the spindle hub 4, and the socket 112 is configured to receive a wrench for turning the retainer 106. When the retainer 106 is turned down, it draws its flange 110 tightly against shoulder 96 in the outer joint member 86 of the CV joint 8. Thus, the retainer 96 clamps the outer joint member 86 against the cone 66 of the bearing 6 and further clamps the cone 66 between the outer joint member 86 and the shoulder 58 on the spindle 40. Actually, the plug 108 of the retainer 106 projects out of the threaded bore 48 in the spindle 40 and is fitted with a lock nut 114.

In addition to the outer joint member 86, the CV joint 8 has an inner joint member 116 provided with arcuate grooves 118 that open toward the grooves 100 in the member 86 and balls 120 that are located in the grooves 100 and 118, to couple the inner joint member 116 to the outer joint member 86. The axle shaft S is attached to the inner joint member 116.

The outboard seal 10 includes a metal seal case 124 which is pressed into the outboard counterbore 24 of the knuckle 2. It also has an elastomeric seal element 126 which is bonded to the seal case 124 and includes lips which bear against the flange 42 of the hub 4 and also against the thrust rib 62 that leads away from the flange 42, thus establishing fluid barriers that close the outboard end of the bearing 6.

The inboard seal 12 includes (FIG. 2) a seal case 130 which fits into the inboard counterbore 24 of the knuckle 2, a shield 132 which fits around the thrust rib 78 of the cone 66, and an elastomeric seal element 134 which is bonded to the seal case 130 and establishes a dynamic fluid barrier along the shield 132. Both the case 130 and the shield 132 are metal stampings.

More specifically, the case 130 has an axial wall 136 that is pressed into the inboard counterbore 24 and a radial wall 138 which projects inwardly toward the thrust rib 78 on the cone 66. The shield 132, on the other hand, has an axial wall 140 that is pressed over the cylindrical surface of the thrust rib 78 for the cone 66 and a radial wall 142 that projects away from the thrust rib 78 and lies behind the radial wall 138 of the case 130 so that the radial wall 138 of the case 130 is interposed between the inboard row of rollers 72 and the radial wall 142 of the shield 132. Indeed, the radial wall 142 of the shield 132 lies generally at the back face 80 of the cone 66 and contains apertures 144 arranged at equal circumferential intervals in it. The seal element 134 is bonded to the radial wall 138 of the case 130 at and near the inner margin of that wall, and it possesses two lips, at least one of which bears against the axial wall 140 of the shield 132. The lips on the seal element 134 effect a dynamic fluid barrier along the axial wall 142 of the shield 132, and that barrier closes and isolates the inboard end of the bearing 6. The seal element 134 may possess the configuration of the seal element disclosed in U.S. Pat. No. 4,770,548.

The outer member 86 of the CV joint 8 carries the slinger 16 which establishes a fluid barrier between the outer member 86 and the knuckle 2. It includes a case 148 formed as a metal stamping with an axial wall 150 and a radial wall 152. The axial wall 150 is pressed over the slinger seat 98 on the outer member 86 of the CV joint 8. The radial wall 15 projects outwardly from the axial wall 150 and lies behind the large counterbore 26 and end face 28 of the knuckle 2. In addition, the slinger 16 has an elastomeric seal element 154 which is bonded to the axial wall 150 and, for the most part, takes the form of a lip, the end of which bears against the end face 28 on the knuckle 2. The seal element 154 lies close to the rigid radial wall 152 and its outer diameter is slightly less, so that radial wall 152 protects the seal element 154, both during handling and in operation. The inboard seal 12 and the slinger 16 close the ends of an annular space into which the speed sensor 14 projects through the oblique bore 36 in the knuckle 2, so that the sensor 14 can monitor rotation of the radial wall 142 on the shield 132 of the inboard seal 12. To this end, the sensor 14 includes a shank 160 which is small enough in diameter to fit through the oblique bore 36 in the knuckle 2 and a head 162 from which the shank 160 extends at a shoulder 164. At its opposite end the shank 160 has a sensing surface 166 which lies close to the radial wall 142 for the shield 132 of the inboard seal 12, and indeed is beveled so that is parallel to the radial wall 142. Near the shoulder 164 the shank 160 has a groove which receives an elastomeric O-ring 168. Here the O-ring 168 is compressed between the base of its groove and the surface of the bore 36, to establish a fluid tight barrier in the bore 36 so that contaminants cannot pass through it and enter the annular space between the inboard seal 12 and the slinger 16.

When the sensor 14 is fully installed in the oblique bore 36, its shoulder 164 bears against the pad 30. The head 162 has a nib 170 (FIG. 1) which projects under the surface 34 at the recess 32 in the knuckle 2 and thus prevents the sensor 14 from migrating out of the oblique bore 36. The head 162 also contains a pry slot 172 (FIG. 2) along the shoulder 164 on its opposite side—indeed, 180° from the nib 170—for accommodating a screw driver, so that the screw driver may lift the head 162 away from the pad 30 with enough force to dislodge the nib 170 from the surface 34 and allow the sensor 14 to be withdrawn from the knuckle 2.

The sensor 14 has the capacity to detect rotation of the radial wall 142 on the shield 132 of the inboard seal 12. By reason of the apertures 144 in the radial wall 142, the radial wall 142 has varying magnetic properties which cause the sensor 14 to produce a pulsating signal, with that signal basically representing a count of the apertures 144 passing by the sensing surface 166 of the sensor 14 per unit of time. The sensor 14 may operate on any of a number of known regimens, such as variable voltage generation in a coil, solid state Hall effect or magnetoresistor sensing disturbances in a magnetic field created by a permanent magnet, or coil impedance variation using an AC magnetic field. In effect, the radial wall 142 of the shield 132 serves as a tone ring for the sensor 14.

In the operation of the wheel end A, the hub 4 rotates about the axis X as the road wheel W, which is attached to it, rolls over a road surface The weight of a vehicle, of which the wheel end A is a part, transfers through the knuckle 2, bearing 6 and to the hub 4 to the wheel W. Actually, the spindle 40 of the hub 4 rotates within the knuckle 2, with the bearing 6 accommodating this rotation. The tapered rollers 72, being in two rows which are opposed, further confines the hub 4 axially with respect to the knuckle 2. Moreover, since the bearing 6 is in a condition of preload, the axis X of rotation remains stable, that is to say, it is fixed in position with respect to the knuckle 2.

Being close to the road surface, the wheel end A encounters contaminants and such as water, dirt, sand and ice-melting chemicals, and also debris such as small rocks and metal fragments. The outboard seal 10 prevents the contaminants from entering the bearing 6 at its outboard end, so that the contaminants do not migrate into the raceways 60, 76 and 82 or the rollers 72 from that end of the bearing 6. The inboard seal 12 and slinger 16 exclude the contaminants from the inboard end of the bearing 6. Here the contaminants and debris as well first encounter the slinger 16, which rotates inasmuch as it is mounted on the outer member 86 of the CV joint 8. The radial wall 152 of the slinger 16 deflects and flings the contaminants and debris away from the CV joint 8. So does the lip of its seal element 154. Moreover, the lip of the seal element 154 effects a dynamic fluid barrier with the end face 28 of the knuckle 2, and thereby excludes contaminants from the large bore 26 into which the shank 160 of the speed sensor 14 projects. Any contaminants which migrate past the slinger 16 are kept from the bearing 6 by the inboard seal 12. Not only does the elastomeric seal element 134 create a fluid barrier within the seal 12, but the radial wall 142 of the shield 132 further serves as a slinger for deflecting the contaminants away from the bearing 6.

When the hub 4 rotates, the cone 66 of the bearing 6 rotates with it. So does the shield 132 of the inboard seal 12, inasmuch as it is pressed onto the thrust rib 78 of the cone 66. The radial wall 142 of the shield 132 rotates in front of the inner end of the shank 160 for the sensor 14. The apertures 144 in the rotating radial wall 142 create disturbances or disruptions which sensor 14 detects, enabling the sensor 14 to produce a pulsating single, the frequency of which reflects the angular velocity of the hub 4.

Figure 3:
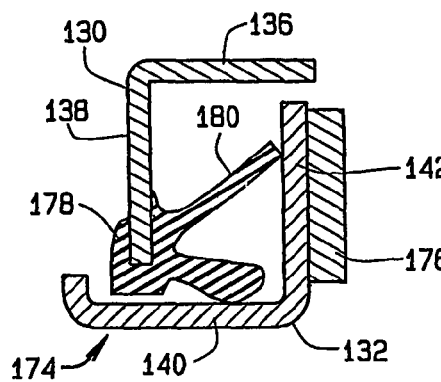
FIG. 3 is a sectional view of a modified seal for the wheel end.

A modified inboard seal 174 (FIG. 3) has both a case 130 and a shield 132 similar to their counterparts in the seal 12. As such the shield 132 has an axial wall 140 and a radial wall 142. However, the radial wall 142 is solid, that is to say, devoid of the apertures 144, and instead is provided with on encoder disk 176 which is bonded to its face that is presented toward the speed sensor 14. The encoder disk 176 is formed from a polymer which is loaded with ferrite that is magnetized. Thus, the disk 176 converts the radial wall 142 into a tone ring. Moreover, modified seal 174 has a seal element 178 that not only has a pair of lips that establish fluid barriers along the axial wall 140 of the shield 132, but also has an additional lip 180 which establishes a fluid barrier along continuous surface of the radial wall 142. This better enables the wheel end to withstand water submission.

Figure 4:
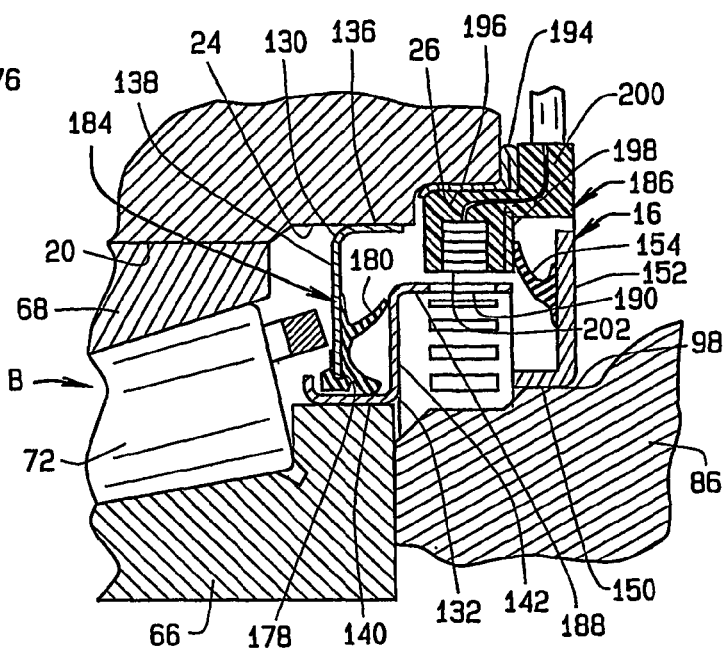
FIG. 4 is fragmentary section view of a modified wheel end.

A modified wheel end B (FIG. 4) is very similar to the wheel end A, although differences exist. Those differences reside primarily in a modified inboard seal 184 and a modified sensor 186. Like the knuckle 2 of the wheel end A, the knuckle 2 of the wheel end B has an inboard counterbore 24 beyond the inboard cup 68 and an even larger counterbore 26 leading away from the counterbore 24 and opening out of the end face 28 on the knuckle 2. The knuckle 2 for the wheel end B has no pad 30, recess 32, surface 34 or oblique bore 36.

The inboard seal 184 for modified wheel end B has its case 130 pressed into the inboard counterbore 24 of the knuckle 2 and its shield 132 around the thrust rib 78 of the cone 66. Indeed, the axial wall 140 of the shield 132 fits around the thrust rib 78 with an interference fit, and the radial wall 142 projects outwardly from the axial wall 140, it being devoid of apertures 144 and therefore solid. In addition, the shield 132 for the seal 184 has an outer axial wall 188 directed from the radial wall 142 at a diameter greater than the inner axial wall 140 and in the opposite direction. The outer axial wall 188 projects away from the bearing 6 and into the larger counterbore 26. It contains apertures 190 which are arranged at equal circumferential intervals. Moreover, the seal element 134 for the seal 184, in addition to the two lips which establish fluid barriers along the inner axial wall 140 of the shield 132, has an additional lip 180 which bears against and establishes another fluid barrier along the solid radial wall 142 of the shield 132, all much the same as the seal 174.

The sensor 186 for the modified wheel end B has a stamped metal case 194 which is pressed into larger counterbore 26 that opens out of the rear face 28 of the knuckle 2. Actually, the case 194 has an axial wall 196 that fits into the counterbore 26 with an interference fit and a radial wall 198 that is directed outwardly and lies against the end face 28 where it doubles back upon itself and extends inwardly past the axial wall 196. Here the radial wall 198 is provided with an aperture. In addition, the sensor 186 has an annular sensing element 200 which is molded from a polymer and lies on both sides of the radial wall 198 and along the inside face of the axial wall 196, it passing through the apertures in the radial wall 198 to be firmly secured to the case 194. On the inside face of the radial wall 198 the molded sensing element 200 possesses a cylindrical sun face 202 which is presented inwardly toward the axis X and surrounds the outer axial wall 188 for the shield 132 of the seal 184. The outside or rear face of the radial wall 198 radially inwardly from the apertures is exposed. The molded sensing element 200 has embedded within it electrical circuitry which operates along a small angle of the surface where it has the capacity to recognize disturbances caused by the apertures 190 in the outer axial wall 188 of the shield 132 when the shield 132 rotates. Thus, the surface 202 functions as a sensing face. The seal element 154 for the slinger 16 bears against the exposed inwardly directed portion of the radial wall 198 for the case 194 where it establishes a fluid barrier along the sensor 186.

Thus, when the hub 4 of the wheel end B rotates, the large axial wall 188 on the shield 132 of the inboard seal 12 rotates. The apertures 190 in the axial wall pass in close proximity to the sensing surface 202 of the sensing element 200, and the sensing element 200 produces a signal reflecting the angular velocity.

Figure 5:
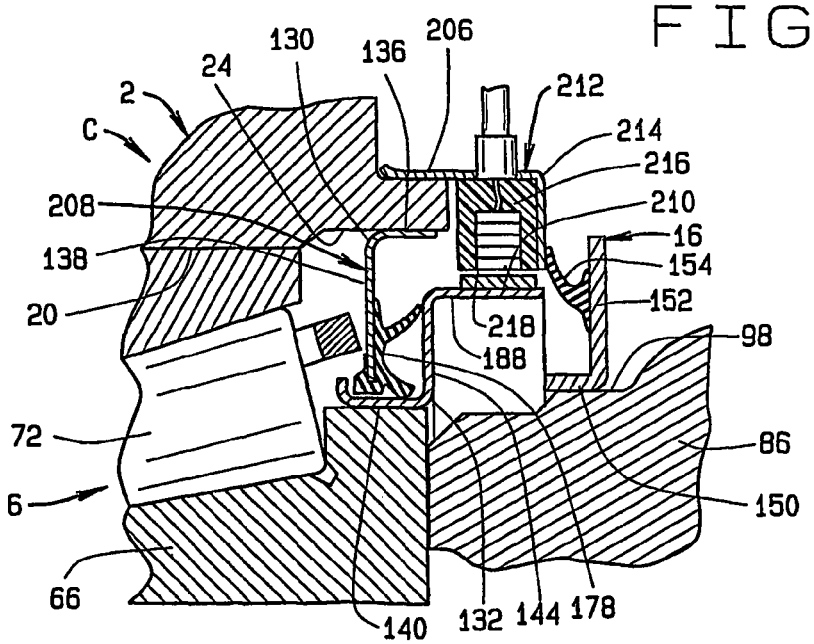
FIG. 5 is a fragmentary sectional view of another modified wheel end.

Another modified wheel end C (FIG. 5) likewise differs from the wheel end A at the rear of its suspension member 2. One difference resides in the absence of a second or larger counterbore, and thus the inboard counterbore 24 opens directly out of the end face 28. Moreover, the end face 28 leads out to a cylindrical mounting surface 206. The wheel end C in its counterbore 24 contains a modified seal 208 which is very similar to the seal 184 of the wheel end B and as such has a seal case 130 to which is bonded a seal element 134 having an additional lip 180. The seal 208 also has a shield 132 provided with an outer axial wall 188 which is larger than the axial wall 136 that fits over the thrust rib 78. The wall 188 likewise projects away from the bearing 6—indeed, past the rear face 28 of the knuckle 2—but it has no apertures 190. Instead, it has an encoder ring 210 attached to its outwardly presented surface. The ring 210, which is formed from a polymer with ferrite embedded in it and magnetized, converts the outer axial wall 188 into a tone ring.

A further difference resides in a sensor 212 which monitors the rotation of the encoder ring 210. The sensor 212 includes a stamped metal case 214 which is pressed over the cylindrical mounting surface 206 on the knuckle 2, and an annular sensing element 216 which is contained within the case 210. The sensing element 216 is molded from a polymer and has a cylindrical surface 218 which is presented inwardly and surrounds the encoder ring 210 on the shield 132, lying in close proximity to it. The sensing element 216 contains electrical circuitry which operates along a small angle of the surface 218 where it has the capacity to detect rotation of the encoder ring 210 and produce a signal reflecting the angular velocity of the shield 132 and hub 4. Thus, the cylindrical surface 218 functions as a sensing face. The metal case 212 extends over the end of the sensing element 216 where it provides a sealing surface against which the lip of the seal element 154 for the slinger 16 bears.

Variations are possible. For example, the outer race of the bearing 6 may be a unitary double cup instead of two single cups 68. Also, the raceway 60, instead of being directly on the spindle 40 of the hub 4, may be on a separate cone fitted over the spindle 40. Moreover, an angular contact ball bearing may be used in lieu of the tapered roller bearing 6.

In the seals 12, 174, 184, 208, the respective seal elements 134, 172, may be bonded to the shields 132 and establish fluid barriers along cases 130.

What is claimed is:

1. A wheel end for an automotive vehicle said wheel end comprising:
    a knuckle having a bearing cavity that opens out of at least one end of the knuckle and includes a bore;
    a hub having a spindle which projects into the bearing cavity;
    an antifriction bearing located in the cavity and around the spindle to enable the hub to rotate relative to the knuckle about an axis of rotation, the bearing including a outer race fitted tightly into the bearing cavity, yet offset from the bore, an inner race located around the spindle, and rolling elements located between the inner and outer races, the inner race having a rib at one of its ends, with the rib being located within the bore of the bearing cavity;
    a seal located in the bore of the bearing cavity and around the rib on the inner race, the seal including a first seal member fitted tightly in the bore of the bearing cavity, a second seal member mounted firmly on the thrust rib of the inner race, and a flexible seal element attached to one of the seal members and establishing a fluid barrier along the other seal member, the second seal member also having a tone ring, and
    a sensor carried by the knuckle and having a sensing face which is presented toward the tone ring on the second seal member, the sensor being capable of producing a signal which reflects the angular velocity of the tone ring and the hub.

2. A wheel end according to claim 1 wherein the second seal member has a radial wall that extends outwardly away from the rib of the inner race, and the tone ring is part of the radial wall.

3. A wheel end according to claim 1 wherein the second seal member has an axially directed wall and the tone ring is part of the axially directed wall.

4. A wheel end according to claim 1 wherein the second seal member has an inner axial wall which is pressed over the rib on the inner bearing race and a radial wall which is attached to and projects outwardly away from the inner axial wall.

5. A wheel end according to claim 4 wherein the tone ring is part of the radial wall of the second seal member.

6. A wheel end according to claim 5 wherein the sensor projects through the knuckle into the bearing cavity at an angle with respect to the axis.

7. A wheel end according to claim 6 wherein the sensor includes a shank having the sensing face at its one end, and a head at the other end to provide a shoulder; and wherein the shoulder is against an exterior surface on the knuckle.

8. A wheel end according to claim 7 wherein the head of the sensor has a nib which is against another exterior surface on the knuckle to prevent withdrawal of the sensor from the bearing cavity.

9. A wheel end according to claim 6 and further comprising a CV joint engaged with the spindle beyond the inner race, and a slinger mounted on the CV joint beyond the bearing cavity and having a wall which extends outwardly away from the axis and a flexible seal element which contacts and forms a fluid barrier along the knuckle around the end of the bearing cavity.

10. A wheel end according to claim 4 wherein the second seal member has an outer axial wall attached to the radial wall; wherein the inner axial wall and outer axial wall of the second seal member project in opposite axial directions from the radial wall; and wherein the tone ring is part of the outer axial wall.

11. A wheel end according to claim 10 wherein the sensor surrounds the axis and the sensing face is located around the outer axial wall on the second seal member.

12. A wheel end according to claim 11 and further comprising a CV joint engaged with the spindle beyond the inner race of the bearing, and a slinger mounted on the spindle and having a radial wall that extends outwardly and a flexible seal element located between the radial wall of the slinger and the sensor.

13. A wheel end for an automotive vehicle, said wheel end comprising:
    a knuckle having a front face and a rear face and a bearing cavity which extends between and opens out of both faces, the cavity including at least one bore that leads toward the rear face,
    a hub having a spindle that extends through the bearing cavity and a flange which is attached to the spindle and is located opposite the front face of the knuckle;
    a bearing located within the bearing cavity of the knuckle and around the spindle of the hub for enabling the hub to rotate in the knuckle about an axis of rotation, the bearing including an outer race in the cavity of the knuckle, where it is offset from said one bore, with the outer race having outboard and inboard outer raceways presented inwardly toward the axis, the bearing also including outboard and inboard inner raceways carried by the hub and presented toward the outboard and inboard outer raceways, respectively, the inboard inner raceway being on an initially separate inner race component that is around the spindle of the hub, the bearing also including rolling elements organized in an outboard row between the outboard raceways and an inboard row between the inboard raceways;
    an outboard seal establishing a fluid barrier between knuckle and hub opposite the outboard row of rolling elements;
    an inboard seal establishing a fluid barrier between the knuckle and hub opposite the inboard row of rolling elements, the inboard seal including a first seal member located in said one bore of the knuckle beyond the outer race, a second seal member located on the initially separate inner race component, and a seal element carried by one of the seal members and establishing a fluid barrier with the other seal member, the second seal member having a tone ring; and
    a sensor mounted on the knuckle and having a sensing face presented toward the tone ring on the second seal member, the sensor having the capacity to monitor rotation of the tone ring and to produce a signal that reflects the angular velocity of the tone ring.

14. A wheel end according to claim 13 wherein the first seal member has a generally radial wall and the second seal member has a generally radial wall, and the radial wall of the first seal member lies between the rolling elements of the inboard row and the radial wall of the second seal member.

15. A wheel end according to claim 14 wherein the second seal member has an axial wall that is mounted on and projects away from the radial wall of the second seal member, and the tone ring is part of the axial wall.

16. A wheel end according to claim 14 wherein the tone ring is part of the radial wall of the second seal member.

17. A wheel end according to claim 16 and further comprising a CV joint engaged with the spindle beyond the initially separate inner race, and a slinger mounted on the CV joint and located axially beyond said one bore of the cavity.

18. A wheel end according to claim 17 wherein the slinger includes a flexible seal element which contacts the rear face of the knuckle.

19. A wheel end according to claim 17 wherein the sensor is in the form of a ring which is fitted to the knuckle where the bearing cavity opens out of the rear face of the knuckle; and wherein the slinger includes a flexible seal element which contacts the sensor.

20. A wheel end according to claim 16 wherein the sensor projects through the knuckle into the bearing cavity at an angle with respect to the axis.

21. A wheel end according to claim 20 wherein the sensor has a shank which projects through the knuckle and a head which is attached to the shank and lies outside the knuckle.

22. A wheel end according to claim 21 wherein the head of the sensor has a shoulder at one end of the shank and a nib which projects laterally; and wherein the shoulder is against a surface on the knuckle and the nib is against another surface of the knuckle.

* * * * *